(12) United States Patent
Kaneda et al.

(10) Patent No.: US 9,690,847 B2
(45) Date of Patent: Jun. 27, 2017

(54) SELECTING CONTENT USING QUERY-INDEPENDENT SCORES OF QUERY SEGMENTS

(71) Applicant: Google Inc., Mountain View, CA (US)

(72) Inventors: Yuji Kaneda, Kanagawa (JP); Amir Najmi, San Francisco, CA (US); Adam Jacob Prins, Tokyo (JP)

(73) Assignee: Google, Inc., Mountain View, CA (US)

( * ) Notice: Subject to any disclaimer, the term of this patent is extended or adjusted under 35 U.S.C. 154(b) by 533 days.

(21) Appl. No.: 14/454,380

(22) Filed: Aug. 7, 2014

(65) Prior Publication Data

US 2016/0041984 A1    Feb. 11, 2016

(51) Int. Cl.
*G06F 17/30* (2006.01)

(52) U.S. Cl.
CPC .. *G06F 17/30646* (2013.01); *G06F 17/30867* (2013.01); *G06F 17/30672* (2013.01)

(58) Field of Classification Search
CPC ......... G06F 17/30867; G06F 17/30646; G06F 17/30672
See application file for complete search history.

(56) References Cited

U.S. PATENT DOCUMENTS

| | | | |
|---|---|---|---|
| 6,772,150 B1 * | 8/2004 | Whitman | G06F 17/30448 707/721 |
| 7,577,643 B2 * | 8/2009 | Dominowska | G06F 17/30616 |
| 7,627,613 B1 | 12/2009 | Dulitz et al. | |
| 7,739,209 B1 | 6/2010 | Rajaraman | |
| 7,925,498 B1 * | 4/2011 | Baker | G06F 17/2795 704/10 |
| 8,037,086 B1 * | 10/2011 | Upstill | G06F 17/2795 704/10 |
| 8,392,440 B1 * | 3/2013 | Papachristou | G06F 17/30646 707/759 |
| 8,706,720 B1 | 4/2014 | Rajaraman | |
| 8,756,241 B1 * | 6/2014 | Thite | G06F 17/30672 707/721 |
| 9,411,889 B2 * | 8/2016 | Zhu | |
| 2008/0114721 A1 * | 5/2008 | Jones | G06Q 30/0254 |
| 2008/0244428 A1 | 10/2008 | Fain et al. | |
| 2010/0094835 A1 * | 4/2010 | Lu | G06F 17/30672 707/705 |

(Continued)

FOREIGN PATENT DOCUMENTS

EP    2397955    12/2011

*Primary Examiner* — Merilyn Nguyen
(74) *Attorney, Agent, or Firm* — Fish & Richardson P.C.

(57) ABSTRACT

Methods, systems, and apparatus include computer programs encoded on a computer-readable storage medium, including a method for responding to queries. A first user query is received. The first user query is processed including identifying one or more segments in the first user query, a segment representing a word or a phrase. A stand-alone score is determined for each segment of the first user query, wherein the stand-alone score is an indication of a likelihood that the segment represents a stand-alone query and that the segment represents a main topic of the first user query. A historical log of queries is processed to determine query-independent scores for segments that are included in queries represented by the log. The final query-independent scores are used to determine the stand-alone score for each segment of the first query.

20 Claims, 4 Drawing Sheets

(56) References Cited

U.S. PATENT DOCUMENTS

| | | | |
|---|---|---|---|
| 2011/0231423 A1* | 9/2011 | Lopiano | G06F 17/275 707/760 |
| 2012/0323896 A1 | 12/2012 | Dulitz et al. | |
| 2013/0054582 A1 | 2/2013 | MacKlem et al. | |
| 2013/0086509 A1* | 4/2013 | Satyanarayana | G06F 17/3064 715/781 |
| 2014/0143222 A1 | 5/2014 | Jain et al. | |
| 2014/0143238 A1 | 5/2014 | Jain et al. | |
| 2014/0222776 A1 | 8/2014 | Zhu et al. | |
| 2016/0328380 A1* | 11/2016 | Yao | G06F 17/30663 |

\* cited by examiner

SELECTING CONTENT USING QUERY-INDEPENDENT SCORES OF QUERY SEGMENTS

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for scoring queries. The method includes receiving a first user query. The method further includes processing the first user query including identifying one or more segments in the first user query, a segment representing a word or a phrase. The method further includes determining a stand-alone score for each segment of the first user query, wherein the stand-alone score is an indication of a likelihood that the segment represents a stand-alone query and that the segment represents a main topic of the first user query. Determining includes processing a historical log of queries to determine query-independent scores for segments that are included in queries represented by the log. Processing a historical log of queries includes identifying an initial query-independent score for a given segment and processing a first query in the log and determining a query-dependent score for each segment in the first query in the log including normalizing the query-dependent scores for the query. Processing a historical log of queries further includes processing a plurality of other queries in the log and determining a query dependent score for each segment for a given query. Processing a historical log of queries further includes adjusting the initial query-independent scores for segments associated with the first query based on the determined and normalized query-dependent scores for the first query and the plurality of second queries to create updated query-independent scores for a given segment, including applying a first function to the query-dependent scores for the segments determined by the processing. Processing a historical log of queries further includes saving the updated query-independent scores for the segments and repeating the processing, adjusting and saving using the updated query-independent scores. The method further includes using the updated query-independent scores to determine the stand-alone score for each segment of the first user query.

These and other implementations can each optionally include one or more of the following features. At least one segment can be a plurality of consecutive words in the query. The first function can be a mathematical average. The method can further include parsing the first query, looking up the stand-alone score for each segment in the first query, and applying a second function to the stand-alone scores for each segment to determine a self-sufficiency score for the first query. The second function can be a sum. The method can further include: executing a process including identifying one or more candidate content items from an inventory to serve in response to the first query, identifying one or more keywords associated with a given one of the candidate content items, determining query-independent scores for each of the one or more keywords, and determining a self-sufficiency score for a given candidate content item based on the query-independent scores for the keywords associated with the content item; repeating the process for other ones of the content items from the inventory; comparing the self-sufficiency score of the first query to the self-sufficiency scores of the ones of the content items to locate a match; and providing a matching content item responsive to the first query. The method can further include, for all matching content items located, conducting an auction to determine which matching content item to use when providing the matching content item. The method can further include summing scores for all keywords associated with a content item in the inventory, comparing the sum to a first threshold, and not qualifying the content item for inclusion in the auction when the threshold is not met. The method can further include summing scores for all segments in the first query and not using the self-sufficiency score to select a content item when the sum is below a second threshold. Processing the first query in the log and determining the query-dependent score for each segment can include using a query-independent score for each segment.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a first user query; process the first user query, including identifying one or more segments in the first user query, a segment representing a word or a phrase; and determine a stand-alone score for each segment of the first user query, wherein the stand-alone score is an indication of a likelihood that the segment represents a stand-alone query and that the segment represents a main topic of the first user query. Determining includes: processing a historical log of queries to determine query-independent scores for segments that are included in queries represented by the log including: identifying an initial query-independent score for a given segment; processing a first query in the log and determining a query-dependent score for each segment in the first query in the log including normalizing the query-dependent scores for the query; processing a plurality of other queries in the log and determining a query dependent score for each segment for a given query; adjusting the initial query-independent scores for segments associated with the first query based on the determined and normalized query-dependent scores for the first query and the plurality of second queries to create updated query-independent scores for a given segment, including applying a first function to the query-dependent scores for the segments determined by the processing; saving the updated query-independent scores for the segments; and repeating the processing, adjusting and saving using the updated query-independent scores. The updated query-independent scores are used to determine the stand-alone score for each segment of the first user query.

These and other implementations can each optionally include one or more of the following features. At least one segment can be a plurality of consecutive words in the query. The first function can be a mathematical average. The instructions can further cause the one or more processors to parse the first query, look up the stand-alone score for each segment in the first query, and apply a second function to the stand-alone scores for each segment to determine a self-sufficiency score for the first query. The second function can be a sum.

In general, another innovative aspect of the subject matter described in this specification can be implemented in systems, including a system comprising one or more processors and one or more memory elements including instructions. The instructions, when executed, cause the one or more processors to: receive a first user query; process the first user query, including identifying one or more segments in the first user query, a segment representing a word or a phrase; and determine a stand-alone score for each segment of the first user query, wherein the stand-alone score is an indication of a likelihood that the segment represents a stand-alone query and that the segment represents a main topic of the first user query. Determining includes: processing a historical log of queries to determine query-independent scores for segments that are included in queries represented by the log including: identifying an initial query-independent score for a given segment; processing a first query in the log and determining a query-dependent score for each segment in the first query in the log including normalizing the query-dependent scores for the query; processing a plurality of other queries in the log and determining a query dependent score for each segment for a given query; adjusting the initial query-independent scores for segments associated with the first query based on the determined and normalized query-dependent scores for the first query and the plurality of second queries to create updated query-independent scores for a given segment, including applying a first function to the query-dependent scores for the segments determined by the processing; saving the updated query-independent scores for the segments; and repeating the processing, adjusting and saving using the updated query-independent scores. The updated query-independent scores are used to determine the stand-alone score for each segment of the first user query.

These and other implementations can each optionally include one or more of the following features. At least one segment can be a plurality of consecutive words in the query. The first function can be a mathematical average. The instructions can further cause the one or more processors to parse the first query, look up the stand-alone score for each segment in the first query, and apply a second function to the stand-alone scores for each segment to determine a self-sufficiency score for the first query. The second function can be a sum.

Particular implementations may realize none, one or more of the following advantages. The selection of content items responsive to a query can be improved by evaluating a self-sufficiency score of the query in relation to self-sufficiency scores of content items, e.g., using query-independent scores of keywords associated with the content items.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for using query-dependent and query-independent scores for segments of a query to determine stand-alone scores for the segments. For example, a first user query that is received can be processed, including identifying one or more segments in the first user query. Each segment, for example, can represent a word or a phrase. A stand-alone score can be determined for each segment of the first user query. For example, a stand-alone score for a given segment can be an indication of a likelihood that the segment represents a stand-alone query and/or represents a main topic of the first user query. A historical log of queries can be processed to determine query independent scores for segments that are included in queries represented by the log. The final query-independent scores can also be used, for example, to determine the stand-alone score for each segment of the first query. While queries and segments are used as examples herein, the same techniques can be applied to classify other types of components that themselves include sub-components, e.g., lists of items, other content that includes sub-portions or sub-items, or other groups of elements.

Figure 1:
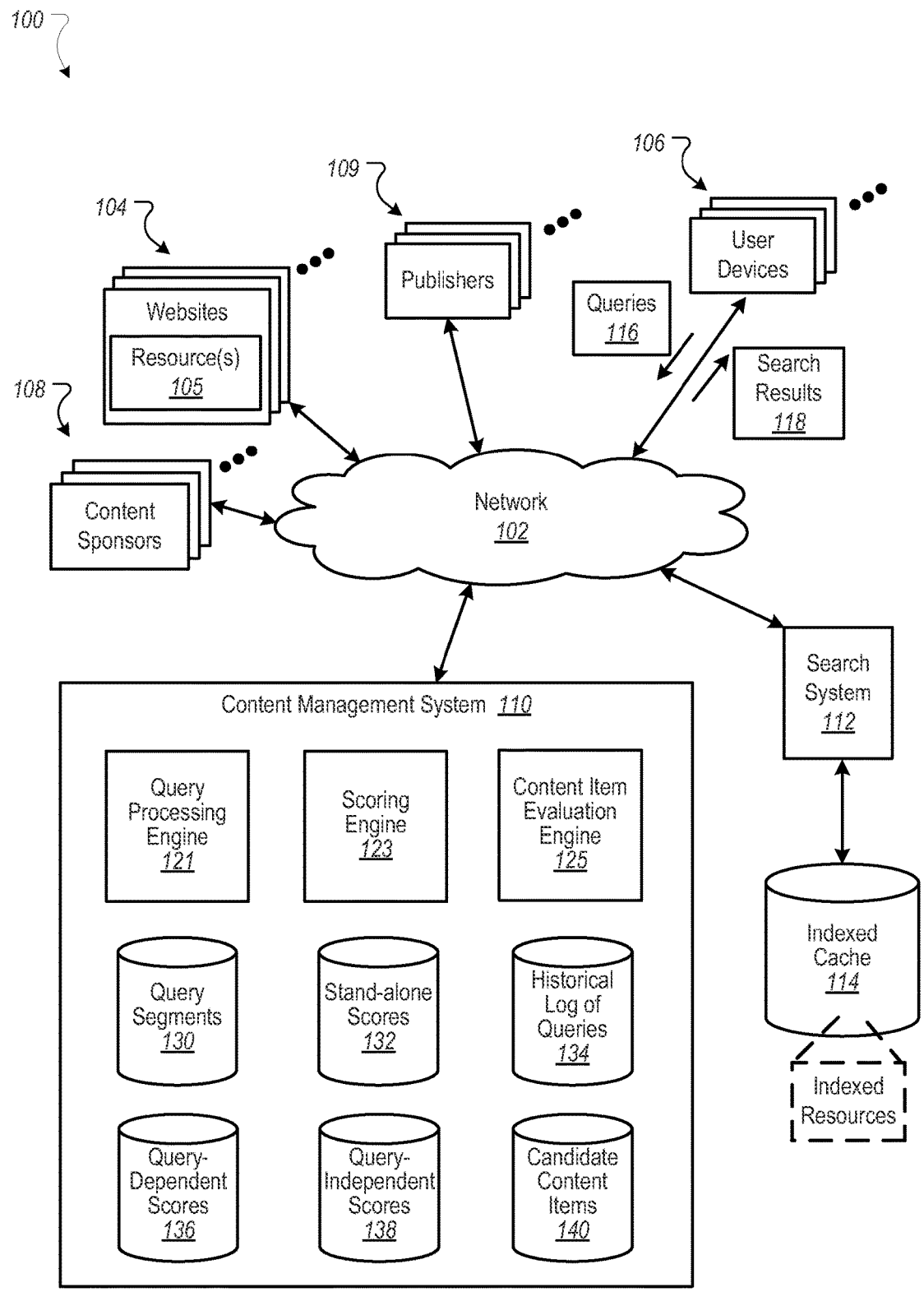
FIG. 1 is a block diagram of an example environment for providing content.

FIG. 1 is a block diagram of an example environment 100 for providing content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104 (e.g., addressable resource), user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. Further, some data stores described herein may include identifiers that can be used to match or access corresponding data records or other information that are stored elsewhere, e.g. locally and/or remotely.

A data store of query segments 130, for example, can store one or more segments that are associated with a given query. Each query segment, for example, can represent a word or a phrase. For example, for the query "hotels new york", the query segments that are stored can include "hotels" "new york" "new" and "york".

A data store of stand-alone scores 132, for example, can store scores that indicate, on a query segment basis, a likelihood that a given segment can occur as a stand-alone query. Stand-alone scores can be calculated based, at least in part, on a likelihood that a user may enter just that query segment as an entire query. Stand-alone scores can also be based on whether the query segment represents a topic, e.g., representing or corresponding to a subject.

A data store of historical log of queries 134, for example, can store information for queries that have been entered in the past (e.g., received by the content management system 110). The information stored for a particular query, for example, can include terms of the query, keywords associated with the query, and results of the query.

A data store of query-dependent scores 136, for example, can include scores that indicate the relative importance, individually, of a segments within a query. For example, a lower query-dependent score may indicate that a segment can be removed from the query without significantly affecting the query's affect in producing results.

A data store of query-independent scores 138, for example, can include a score, for each segment, that indicates an importance of the segment without regard to its inclusion in a given query. Each query-independent score, for example, is independent of any queries in which the segment appears and can be based on occurrences in many different queries, on its own, or with other different segments. Query independent scoring is discussed in greater detail below.

An inventory of content items 140, for example, can include candidate content items that can be selected in response to a received query or other request for content. Information stored for each of the candidate content items can include selection criteria including associated keywords, e.g., that can be matched to terms in a received query.

The content management system 110 can include plural engines, some or all of which may be combined or separate, and may be co-located or distributed (e.g., connected over the network 102). A query processing engine 121, for example, can process a received query into segments. For example, each segment can include one or more words (e.g., query terms) from the received query.

A scoring engine 123, for example, can calculate various types of scores, e.g., including stand-alone scores for query segments, query-dependent scores for query segments, and query-independent scores for query segments. In some implementations, the scoring engine 123 can access information in a query log (e.g., the historical log of queries 124) to determine the scores.

A content item evaluation engine 125, for example, can identify one or more candidate content items from an inventory (e.g., the inventory of content items 140) to serve in response to a received query. The content item evaluation engine 125 can also identify one or more keywords associated with a given candidate content item for determining query-independent scores for each of the one or more keywords.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In addition, when no search is performed or no keywords are available (e.g., because the user is not browsing a webpage), other information, such as information obtained from one or more snapshots, can be used to respond to the received request. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
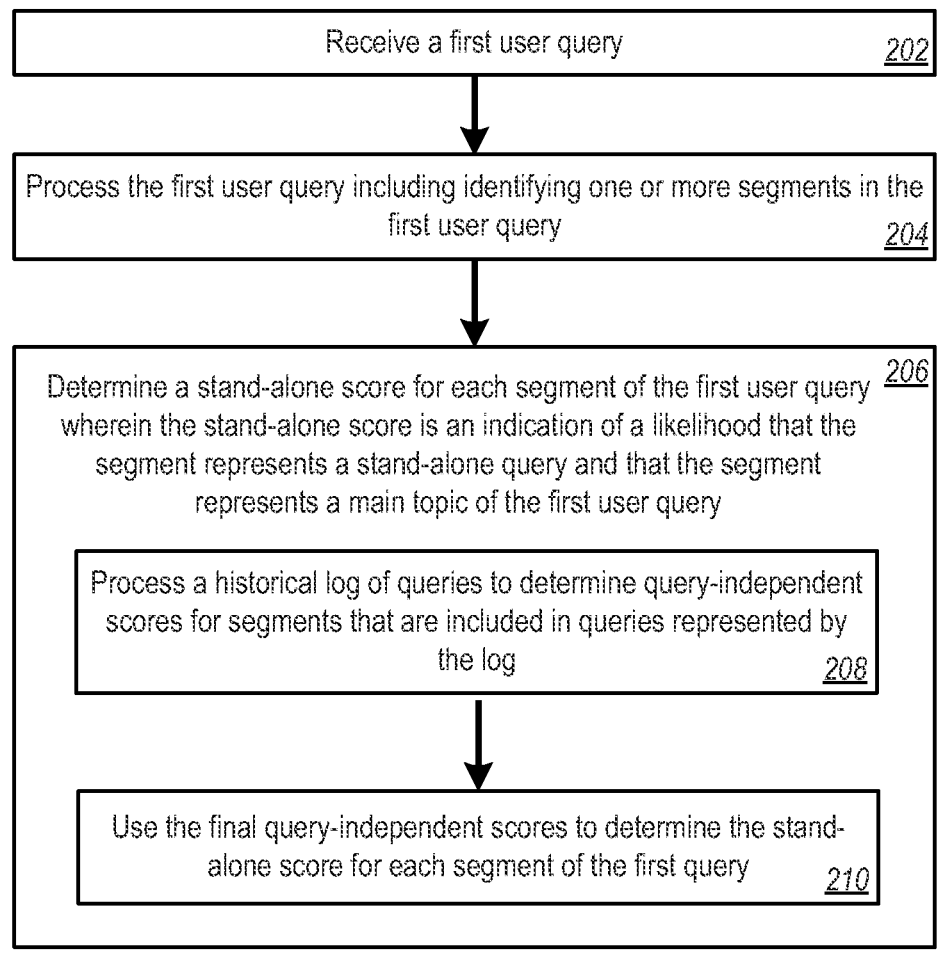
FIG. 2 is a flowchart of an example process for determining query-independent scores for segments in a query.

FIG. 2 is a flowchart of an example process 200 for determining query-independent scores for segments in a query. In some implementations, content management system 110 can perform steps of the process 200 using instructions that are executed by one or more processors. FIG. 1 is used to provide example structures for performing the steps of the process 100. Example algorithms associated with the steps of the process 200 are provided below.

A first user query is received (202). For example, the content management system 110 can receive the search query 116 (e.g., "hotels new york") from a browser executing on the user device 106.

The first user query is processed, including identifying one or more segments in the first user query for which each segment represents a word or a phrase (204). The query processing engine 121, for example, can process the received search query 116 into segments such as "hotels" "new york" "new" and "york". In some implementations, the segments can be stored in the data store of query segments 130. In some implementations, segments can be stored for at least the duration of the process 200 that is executed for a particular received search query 116, and then purged.

In some implementations, at least one segment can be a plurality of consecutive words in the query. For example, the segment "new york" is a segment having two consecutive words, "new" and "york." Segments having three or more consecutive words are also possible, such as "grand central station" and "the statue of liberty."

A stand-alone score is determined for each segment of the first user query (206). The stand-alone score, for example, is an indication of a likelihood that the segment represents a stand-alone query and/or that the segment represents a main topic of the first user query. For example, the scoring engine 123 can calculate stand-alone scores 132 for each of the query segments 130 associated with the search query 116 (e.g., "hotels new york"). Stand-alone scores can be calculated based, at least in part, on a likelihood that a given segment can occur as a stand-alone query, e.g., the likelihood that a user may enter just that query segment as an entire query. Stand-alone scores can also be based on whether the associated query segment represents a topic, e.g., representing or corresponding to a subject (e.g., the city of New York). The query segment "new" may have a very low stand-alone score, e.g., since "new" may rarely occur as an entire user-entered query. The segments "york" "hotels" and "new york" may have increasingly higher stand-alone scores than "new". The segment "new york", for example, may have the highest stand-alone score (among the segments in the current example) because "new york" may be determined to be entered more often as a complete query than the other segments. The stand-alone score can be determined by evaluating one or more data stores that include key value pairs that indicate a given segment and a likelihood score. The likelihood scores can be determined based on an evaluation of queries received over a time period, such as by processing a query log. In some implementations, stand-alone scores that are determined can be based on historical logs. For example, when historical logs are processed, each segment's query-independent score can be determined by looking up that score from a data store.

A historical log of queries is processed to determine query-independent scores for segments that are included in queries represented by the log (208). For example, the scoring engine 123 can access information in the historical log of queries 124 for each of the segments associated with the search query 116 (e.g., "hotels new york"). A description below, with reference to FIG. 3, provides detailed information as to how query-independent scores can be determined for segments of queries represented by the historical log of queries 124.

Figure 3:
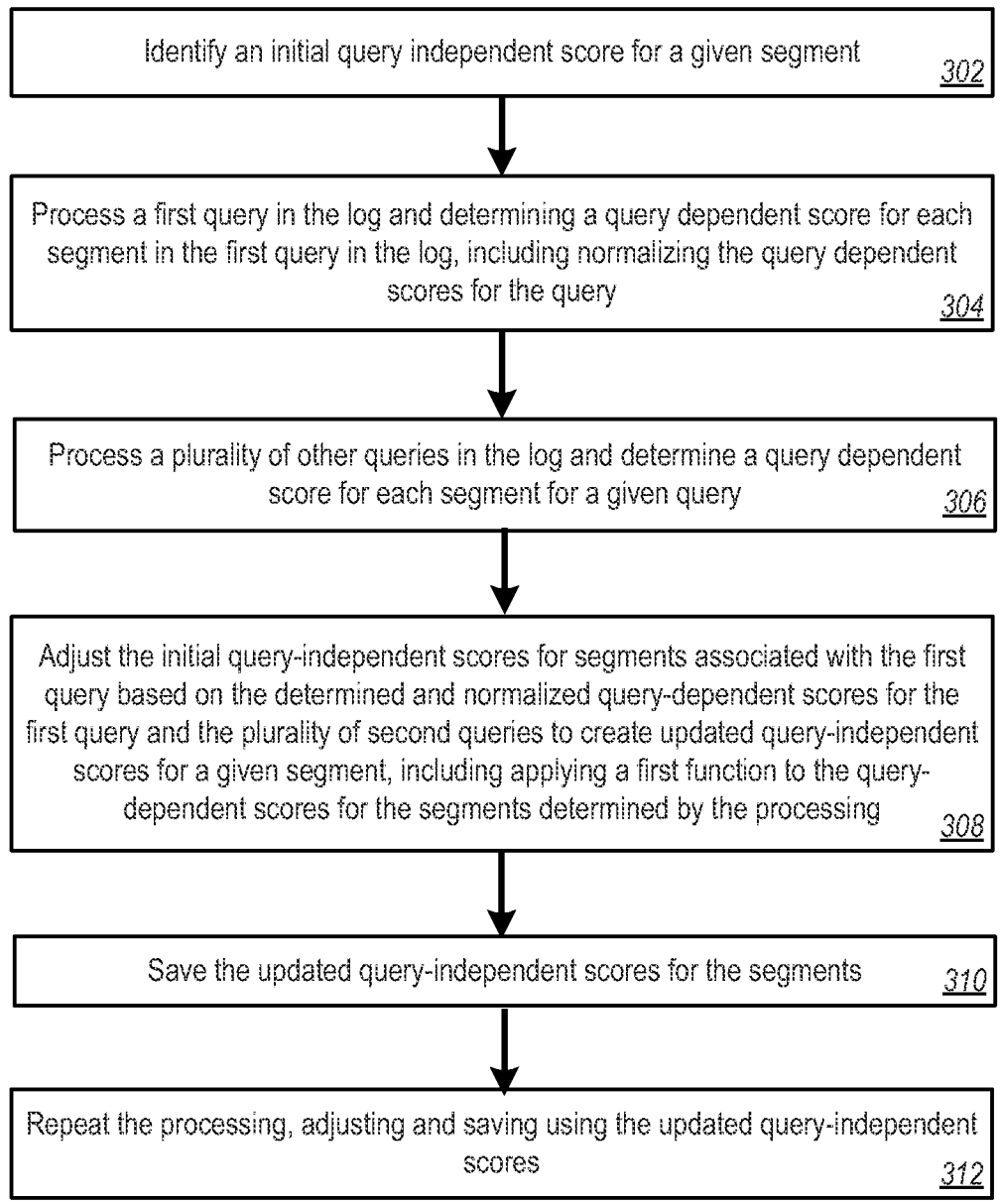
FIG. 3 is a flowchart of an example process for processing a historical log of queries to determine query-independent scores for segments that are included in queries.

FIG. 3 is a flowchart of an example process 300 for processing a historical log of queries to determine query-independent scores for segments that are included in queries. For example, the process 300 can be used, for example, in performing step 208 described above with reference to FIG. 2. In some implementations, the content management system 110 can perform steps of the process 300 using instructions that are executed by one or more processors. FIGS. 1-2 are used to provide example structures for performing the steps of the process 300. Example algorithms associated with the steps of the process 300 are provided below.

An initial query-independent score is identified for a given segment (302). The scoring engine 123, for example, can determine an initial query-independent score for the segment "new york". In some implementations, the initial query-independent score for a particular segment can be set to a common initial value (e.g., 0.5) that is used for all segments identified as part of an initialization process, or set to an initial query-independent score that is otherwise pre-defined (e.g., if values are known on a per-segment basis). The segment "new york" for which the initial query-independent score can be identified, for example, is a segment that is part of the search query 116 and for which at least one query exists in the historical log of queries 134 that includes the same segment.

A first query in the log is processed, and a query-dependent score is determined for each segment in the first query in the log, including normalizing the query-dependent scores for the query (304). For example, the first query can be a query (e.g., "new york city hotels") identified from the historical log of queries 134. The scoring engine 123 can determine a query-dependent score for each segment, e.g., in "new york city hotels". Each query-dependent score, for example, can be based on how well each segment performs independently, e.g., as the sole component of a query. Normalizing the query-dependent scores, for example, can include applying a scale factor to each of the scores so that the scores are all in a predetermined range. Queries that are processed from the log, for example, can include queries that include the given segment (e.g., "new york") identified in step 302. In this example, six segments are identified (e.g., new, york, new york, new york city, city, and hotels) and each may be given an initial query dependent score of 0.5 (e.g., based on the initialized query independent scores for a respective segment), which then may be normalized over the query such that each segment has a resultant query dependent score of 0.166 (assuming for the sake of example that the scores are normalized on a scale from 0-1).

In some implementations and as described above, processing the first query in the log and determining the query-dependent score for each segment can include using a query-independent score for a given segment. For example, the scoring engine 123 can use query-independent scores for segments in the log-identified query "new york city hotels" when determining query-dependent scores for segments.

A plurality of other queries in the log are processed, and a query-dependent score for each segment for a given query is determined (306). For example, the scoring engine 123 can determine query-dependent scores for segments of the remaining queries identified in the log, e.g., other queries that contain the segment "new york". The other queries that are processed in this step, for example, can include other queries, in addition to the first query (e.g. "new york city hotels"), that include the given segment (e.g., "new york") identified in step 302.

The initial query-independent scores for segments associated with the first query are adjusted based on the determined and normalized query-dependent scores for the first query and the plurality of second queries to create updated query-independent scores for a given segment (308). The scoring engine 123, for example, can adjust query-independent scores for segments in the first query (e.g. "new york city hotels"). The adjustment for the "new york" segment, for example, can include adjustments based on the determined and normalized query-dependent scores for segments of queries identified in the historical log of queries 134 that include the segment (e.g., "new york").

In some implementations, updating the query-independent scores for segments can include applying a first function to the query-dependent scores for the segments determined by the processing. In some implementations, the first function can be a mathematical average. For example, the scoring engine 123 can average the query-dependent scores 136 for the first query's segments when adjusting the query-independent scores 138 for the query. In some implementations, other functions can be used (e.g., a median, mean or other function).

The updated query-independent scores for segments are saved (310). For example, the content management system 110 can save query-independent scores for segments associated with the query "new york city hotels" in the data store of query-independent scores 138.

The processing is repeated, adjusting and saving for a plurality of log queries (312). For example, the scoring engine 123 can adjust the query-independent scores for segments of other queries besides "new york city hotels". The content management system 110 can store the adjusted query-independent scores in the data store of query-independent scores 138. As described above with reference to FIG. 2, the updated query-independent scores can be used to determine stand-alone scores for segments in the first user query (e.g., the search query 116, "hotels new york").

In some implementations, the process 300 can further include parsing the first query, looking up the stand-alone score for each segment in the first query, and applying a second function to the stand-alone scores for each segment to determine a self-sufficiency score for the first user query. The scoring engine 123, for example, can use a second function (e.g., a sum) of stand-alone scores associated with segments that are parsed from the query "new york city hotels".

Referring again to FIG. 2, query-independent scores (e.g., determined in the process 300) are used to determine the stand-alone score for each segment of the first query (210). For example, the scoring engine 123 can use query-independent scores 138, determined (e.g., initialized and updated) from entries in the historical log of queries 124, to determine the stand-alone scores 132 for each of the segments from the search query 116. In some implementations, query-independent scores can be used to determine the most important segment in a search query 116, for example, by determining the segment that has the highest score.

In some implementations, the process 200 can further include executing a process for selecting content based on the query-independent scores. For example, the content item evaluation engine 125 can identify one or more candidate content items from an inventory (e.g., the inventory of content items 140) to serve in response to the first query. The content item evaluation engine 125 can identify one or more keywords associated with a given one of the candidate content items and determine query-independent scores for each of the one or more keywords. For example, for a given keyword, a query-independent score can be looked up in the data store of query-independent scores 138. In another example, the query-independent score for a given keyword can be determined from a query-dependent score stored for the keyword in the data store of query-dependent scores. The content item evaluation engine 125 can determine a self-sufficiency score for a given candidate content item based on the query-independent scores for the keywords associated with the content item. For example, the self-sufficiency score for the given candidate content item can be determined based on the query-independent scores for the keywords, as described above for the process 300. The content item evaluation engine 125 can repeat the process for other ones of the content items from the inventory. Using the determined self-sufficiency scores, for example, the content item evaluation engine 125 can evaluate the self-sufficiency scores of the ones of the content items to identify a content item to be provided. When a match is located, for example, the content management system 110 can provide a matching content item responsive to the first query. A match can be made, for example, if the compared self-sufficiency scores are high and if the keywords of a particular candidate content item match, to some degree, terms in the search query 116.

In some implementations, the process 200 can further include, for all matching content items located, conducting an auction to determine which matching content item to use when providing the matching content item. For example, the content management system 110 can include, in an auction for providing content in response to the search query 116, the matching candidate content items. In some implementations, an auction can include the matching candidate content items and other candidate content items that are not included based on self-sufficiency scores. In some implementations, the content management system 110 can provide the winning candidate content item in response to the query.

In some implementations, the process 200 can further include summing scores for all keywords associated with a content item in the inventory, comparing the sum to a first threshold, and not qualifying the content item for inclusion in the auction when the threshold is not met. As an example, the content item evaluation engine 125 can compare the sum of the query-independent scores for the keywords associated with a New York hotel-related content item to a predetermined threshold value, and only include content items in the auction when the sum exceeds the threshold.

In some implementations, the process 200 can further include summing scores for all segments in the first query, and not using the self-sufficiency score as a qualifying criterion when the sum is below a second threshold. As an example, the content item evaluation engine 125 can compute a sum of query-independent scores for the segments of the search query 116. When the sum is below a predetermined threshold, for example, the content item evaluation engine 125 can refrain from selecting a specific content item from the inventory of content items 140 based on the sum.

In some implementations, different algorithms can be used to determine scores, such as query-independent and query-dependent scores. The algorithms can be used, for example, for steps of the processes 200 and 300 described above. Algorithm A, for example, having stages A1-A6, is summarized in the following.

For example, consider as input a set of queries <Q> (e.g., obtainable from query logs). Using Algorithm A, for example, can produce outputs, as will be described. For example, s(t) can be a query-independent score of token <t>, the score reflecting the importance of <t>. Further, t(q,t) can be a query dependent score of token <t> in query <q>, meaning the relative importance of <t> in <q>. The following examples stages can be used to determine t(q,t) and associated values.

At stage A1, for example, s(t) can be initialized. For example, s(t) can be assigned a random value or a constant value (e.g., 0.5).

At stage A2, for each query <q> in <Q>, for example, t(q,t) can be computed for each token <t> in <q> so that, for any given token, a higher s(t) has a corresponding higher t(q, t). For example, if <q> is <hotel sf> (e.g., sf being an abbreviation for San Francisco), if s(<hotel>) is 0.8, and if s(<sf>) is 0.2, then a query-dependent score can be assigned such that:

$$t(<\text{hotel } sf>,<\text{hotel}>) > t(<\text{hotel } sf>,sf>) \quad (1)$$

This relationship can exist because:

$$s(<\text{hotel}>) > s(<sf>) \quad (2)$$

In some implementations, different ways can be used to compute to. For example, t(<hotel sf>, <hotel>) can be computed as 0.94 and t(<hotel sf>, <sf>) can be computed as 0.06.

At stage A3, for example, s(t) can be updated based on t(q, t) from all queries. Different ways can be used to compute s(t), but a simple way is to use an average of t(q, t). For example, if t(<hotel sf>, <hotel>)=0.7, if t(<hotel new york>, <hotel>)=0.6, and if t(<cheap hotel>, <hotel>)=0.4, then s(<hotel>) can be, for example, 0.57.

At stage A4, for example, stage A2 can be repeated to update t(q, t).

At stage A5, for example, stage A3 can be repeated to update s(t).

At stage A6, for example, stages A2 and A3 can be repeated until pre-determined conversion criteria is satisfied.

In some implementations, different ways can be used that may or may not update s(t) for each query in the log. For example, in the algorithm described above, t(q,t) can be updated for all queries in the log, and s(t) can be updated based on all t(q,t) as shown the above. In some implementations, the Algorithm A can be modified (e.g., to create algorithm B) to update s(t) for each query, e.g., in the following stages B1-B4.

At stage B1 (e.g., same as stage A1 above), for example, s(t) can be initialized. For example, s(t) can be assigned a random value or a constant value (e.g., 0.5).

At stage B2 (e.g., same as stage A2 above), for each query <q> in <Q>, for example, t(q,t) can be computed for each token <t> in <q> so that, for any given token, a higher s(t) has a corresponding higher t(q, t).

At stage B3, for example, s(t) can be updated based on t(q,t).

At stage B4, for example, stages B2 and B3 can be repeated to update s(t), e.g., repeated until pre-determined conversion criteria is satisfied.

In some implementations, Algorithm B can be run against a portion of a log. A first iteration of stages B2 and B3, for example, can produce reasonably good s(t) without repeating stages B2 and B3. Repetition of stages B2 and B3, for example, can produce better scores. In some implementations, determining when to stop repeating stages B2 and B3 can be determine, for example, by measuring the difference between a new s(t) and a previous s(t). For example, if the difference is enough small (e.g., below a predetermined threshold), we can stop the algorithm. In some implementations, a distance function can be used to compute the difference.

In some implementations, the algorithms described above can be used for other types of data. For example, the algorithms can be used to estimate self-sufficiency of ingredients in recipes. Ingredients such as <lamb> and <fish>, for example, may be determined to have higher self-sufficiency scores. Ingredients such as <salt> and <olive oil>, for example, may be determined to have lower self-sufficiency scores. The self-sufficiency scores can be determined, for example, from a set of recipes.

For example, initial recipe-independent scores (e.g., 0.5) can be assigned for each ingredient. For each recipe, a relative self-sufficiency score of each ingredient in the recipe can be computed using the recipe-independent score for the ingredient. Recipe-independent scores can be updated, for example, by aggregating all recipe dependent scores from all receipts. In some implementations, the computed recipe-independent scores can be used to classify recipes by ingredients, such as for use in indexing recipes in a recipe book.

Figure 4:
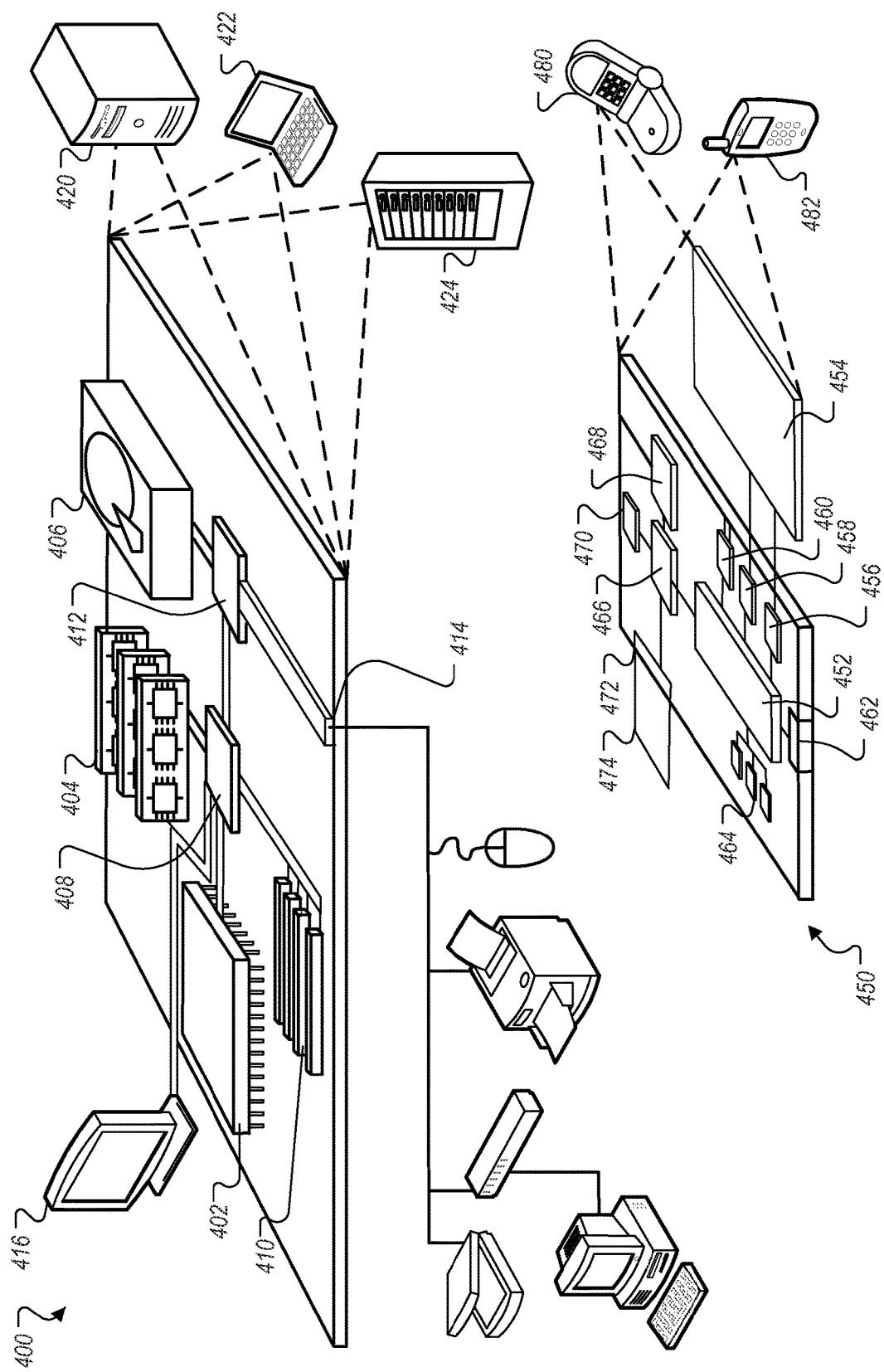
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more processors comprising:
   receiving a first user query from a user device;
   processing the first user query including identifying one or more segments in the first user query, a segment representing a word or a phrase; and
   determining a stand-alone score for each segment of the first user query, wherein the stand-alone score is an indication of a likelihood that the segment represents a stand-alone query and that the segment represents a main topic of the first user query, and wherein determining includes:
      processing a historical log of queries to determine query-independent scores for segments that are included in queries represented by the historical log including:
         identifying an initial query-independent score for a given segment;
         processing a first query in the historical log and determining a query-dependent score for each segment in the first query in the historical log including normalizing the query-dependent scores for the first query;
         processing a plurality of other queries in the historical log and determining a query dependent score for each segment for a given query;
         adjusting the initial query-independent scores for segments associated with the first query based on the determined and normalized query-dependent scores for the first query and the plurality of other queries to create updated query-independent scores for a given segment, including applying a first function to the query-dependent scores for the segments determined by the processing of the first query and the plurality of other queries;
         saving the updated query-independent scores for the segments; and
         repeating the processing of the first query and the plurality of other queries, adjusting and saving using the updated query-independent scores; and
      using the updated query-independent scores to determine the stand-alone score for each segment of the first user query.

2. The computer-implemented method of claim 1 wherein at least one segment is a plurality of consecutive words in the first user query.

3. The computer-implemented method of claim 1 wherein the first function is a mathematical average.

4. The computer-implemented method of claim 1 further comprising parsing the first query, looking up the stand-alone score for each segment in the first query, and applying a second function to the stand-alone scores for each segment to determine a self-sufficiency score for the first query.

5. The computer-implemented method of claim 4 wherein the second function is a sum.

6. The computer-implemented method of claim 1 further comprising:
   executing a process including:
      identifying one or more candidate content items from an inventory to serve in response to the first query;
      identifying one or more keywords associated with a given one of the candidate content items;
      determining query-independent scores for each of the one or more keywords; and
      determining a self-sufficiency score for a given candidate content item based on the query-independent scores for the keywords associated with a given one of the one or more candidate content items;
   repeating the process for other ones of the one or more candidate content items from the inventory;
   comparing the self-sufficiency score of the first query to self-sufficiency scores of the ones of the one or more candidate content items to locate a match; and
   providing a matching content item responsive to the first query.

7. The computer-implemented method of claim 6 further comprising for all matching content items located, conducting an auction to determine which matching content item to use when providing the matching content item.

8. The computer-implemented method of claim 7 further comprising summing scores for all keywords associated with a content item in the inventory, comparing the sum to a first threshold, and not qualifying a content item for inclusion in the auction when the first threshold is not met.

9. The computer-implemented method of claim 6 further comprising summing scores for all segments in the first query, and not using the self-sufficiency score to select a content item when the sum is below a second threshold.

10. The computer-implemented method of claim 1 wherein processing the first query in the historical log and determining the query-dependent score for each segment includes using a query-independent score for each segment.

11. A computer program product embodied in a non-transitive computer-readable medium including instructions, that when executed, cause one or more processors to:
    receive a first user query from a user device;

process the first user query, including identifying one or more segments in the first user query, a segment representing a word or a phrase; and determine a stand-alone score for each segment of the first user query, wherein the stand-alone score is an indication of a likelihood that the segment represents a stand-alone query and that the segment represents a main topic of the first user query, and wherein determining includes:

processing a historical log of queries to determine query-independent scores for segments that are included in queries represented by the historical log including:

identifying an initial query-independent score for a given segment;

processing a first query in the historical log and determining a query-dependent score for each segment in the first query in the historical log including normalizing the query-dependent scores for the first query;

processing a plurality of other queries in the historical log and determining a query dependent score for each segment for a given query;

adjusting the initial query-independent scores for segments associated with the first query based on the determined and normalized query-dependent scores for the first query and the plurality of other queries to create updated query-independent scores for a given segment, including applying a first function to the query-dependent scores for the segments determined by the processing of the first query and the plurality of other queries;

saving the updated query-independent scores for the segments; and repeating the processing of the first query and the plurality of other queries, adjusting and saving using the updated query-independent scores; and using the updated query-independent scores to determine the stand-alone score for each segment of the first user query.

12. The computer program product of claim 11 wherein at least one segment is a plurality of consecutive words in the first user query.

13. The computer program product of claim 11 wherein the first function is a mathematical average.

14. The computer program product of claim 11 wherein the instructions further cause the one or more processors to parse the first query, look up the stand-alone score for each segment in the first query, and apply a second function to the stand-alone scores for each segment to determine a self-sufficiency score for the first query.

15. The computer program product of claim 14 wherein the second function is a sum.

16. A system comprising:
one or more processors; and
one or more memory elements including instructions that, when executed, cause the one or more processors to:
receive a first user query from a user device;
process the first user query, including identifying one or more segments in the first user query, a segment representing a word or a phrase; and determine a stand-alone score for each segment of the first user query, wherein the stand-alone score is an indication of a likelihood that the segment represents a stand-alone query and that the segment represents a main topic of the first user query, and wherein determining includes:

processing a historical log of queries to determine query-independent scores for segments that are included in queries represented by the historical log including:

identifying an initial query-independent score for a given segment;

processing a first query in the historical log and determining a query-dependent score for each segment in the first query in the historical log including normalizing the query-dependent scores for the first query;

processing a plurality of other queries in the historical log and determining a query dependent score for each segment for a given query;

adjusting the initial query-independent scores for segments associated with the first query based on the determined and normalized query-dependent scores for the first query and the plurality of other queries to create updated query-independent scores for a given segment, including applying a first function to the query-dependent scores for the segments determined by the processing of the first query and the plurality of other queries;

saving the updated query-independent scores for the segments; and repeating the processing of the first query and the plurality of other queries, adjusting and saving using the updated query-independent scores; and using the updated query-independent scores to determine the stand-alone score for each segment of the first user query.

17. The system of claim 16 wherein at least one segment is a plurality of consecutive words in the first user query.

18. The system of claim 16 wherein the first function is a mathematical average.

19. The system of claim 16 wherein the instructions further cause the one or more processors to parse the first query, look up the stand-alone score for each segment in the first query, and apply a second function to the stand-alone scores for each segment to determine a self-sufficiency score for the first query.

20. The system of claim 19 wherein the second function is a sum.

* * * * *